(12) United States Patent
Otsuki et al.

(10) Patent No.: US 8,041,447 B2
(45) Date of Patent: Oct. 18, 2011

(54) NUMERICAL CONTROLLER HAVING WORKPIECE SETTING ERROR COMPENSATION MEANS

(75) Inventors: Toshiaki Otsuki, Yamanashi (JP); Soichiro Ide, Yamanashi (JP); Takafumi Sasaki, Yamanashi (JP)

(73) Assignee: FANUC Ltd, Minamitsuru-gun, Yamanashi (JP)

( * ) Notice: Subject to any disclaimer, the term of this patent is extended or adjusted under 35 U.S.C. 154(b) by 394 days.

(21) Appl. No.: 12/192,590

(22) Filed: Aug. 15, 2008

(65) Prior Publication Data
US 2009/0093905 A1 Apr. 9, 2009

(30) Foreign Application Priority Data
Oct. 4, 2007 (JP) .................. 2007-260972

(51) Int. Cl.
G05B 13/02 (2006.01)
G05B 19/25 (2006.01)
G05B 19/41 (2006.01)
G06F 19/00 (2011.01)

(52) U.S. Cl. ............ 700/174; 700/28; 700/30; 700/117; 700/159; 700/173; 700/193; 318/568.15; 318/572; 318/573

(58) Field of Classification Search ............ 700/175, 700/193, 28, 30, 117, 159, 173, 174; 318/572, 318/568.15, 573
See application file for complete search history.

(56) References Cited

U.S. PATENT DOCUMENTS

| | | | |
|---|---|---|---|
| 5,241,250 A * | 8/1993 | Nagasawa et al. ............ | 318/591 |
| 5,266,878 A * | 11/1993 | Makino et al. ............... | 318/571 |
| 5,661,654 A | 8/1997 | Nagashima | |
| 6,522,941 B1 * | 2/2003 | Tashiro et al. ................ | 700/180 |
| 6,744,233 B1 * | 6/2004 | Tsutsui ........................ | 318/560 |
| 6,845,295 B2 * | 1/2005 | Cheng et al. .................. | 700/245 |
| 7,012,395 B2 * | 3/2006 | Haunerdinger et al. ...... | 318/573 |
| 7,110,853 B2 * | 9/2006 | Munz et al. ................... | 700/187 |
| 7,130,718 B2 * | 10/2006 | Gunnarsson et al. ......... | 700/254 |
| 7,180,253 B2 * | 2/2007 | Weinhofer et al. ............ | 318/34 |
| 7,337,694 B2 * | 3/2008 | Ninomiya et al. ............. | 74/542 |
| 7,425,811 B2 * | 9/2008 | Onishi et al. .................. | 318/569 |
| 7,433,754 B2 * | 10/2008 | Otsuki et al. .................. | 700/159 |

(Continued)

FOREIGN PATENT DOCUMENTS

JP 63-132307 6/1988

(Continued)

OTHER PUBLICATIONS

Japanese Notice of Reasons for Rejection mailed Jan. 27, 2009 issued in Japanese Application No. 2007-260972. European Search Report dated Dec. 3, 2010 that issued in European Application No. 08162643.4, Patent No. 2206/2045677.

*Primary Examiner* — Albert Decady
*Assistant Examiner* — Jennifer Norton
(74) *Attorney, Agent, or Firm* — Drinker Biddle & Reath LLP

(57) ABSTRACT

A numerical controller controlling a 5-axis machine tool compensates setting error that arises when a workpiece is set on the table. Error in the three linear axes and the two rotation axes are compensated using preset error amounts to keep the calculated tool position and tool direction in a command coordinate system. If a trigonometric function used for error compensation has a plurality of solution sets, the solution set closest to the tool direction in the command coordinate system is selected from the plurality of solution sets and used as the positions of the two rotation axes compensated in the above error compensation.

3 Claims, 6 Drawing Sheets

U.S. PATENT DOCUMENTS

| | | | |
|---|---|---|---|
| 7,869,898 B2 * | 1/2011 | Scholich-Tessmann | 700/193 |
| 2003/0229415 A1 * | 12/2003 | Andersen et al. | 700/176 |
| 2006/0004489 A1 * | 1/2006 | Weiss | 700/245 |
| 2009/0140684 A1 * | 6/2009 | Otsuki et al. | 318/572 |
| 2011/0046773 A1 * | 2/2011 | Iwashita et al. | 700/182 |

FOREIGN PATENT DOCUMENTS

| | | |
|---|---|---|
| JP | 9-207089 | 8/1997 |
| JP | 2007-000954 | 1/2007 |
| JP | 2007293522 A * | 11/2007 |

* cited by examiner

FIG. 3
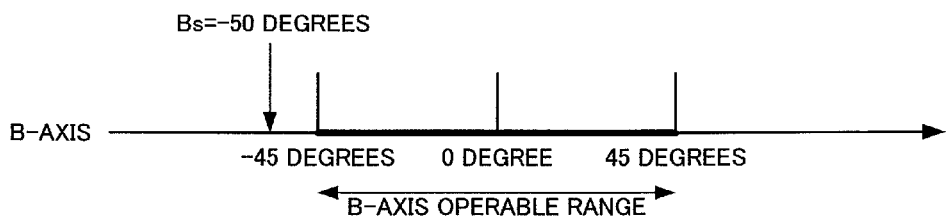
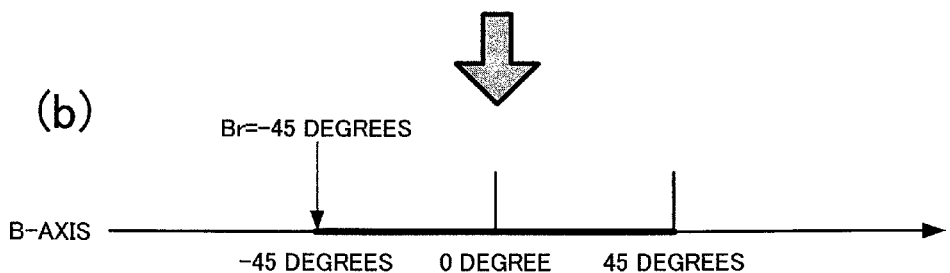
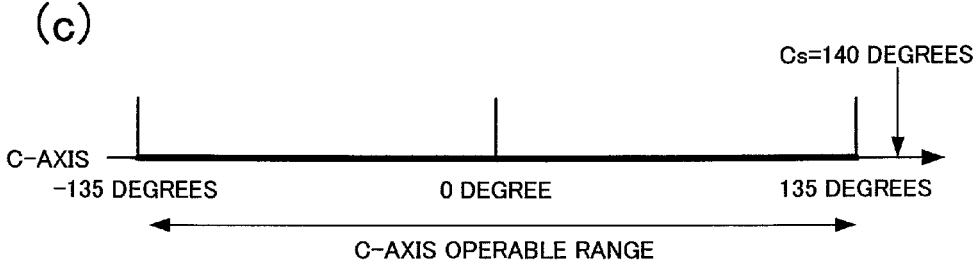
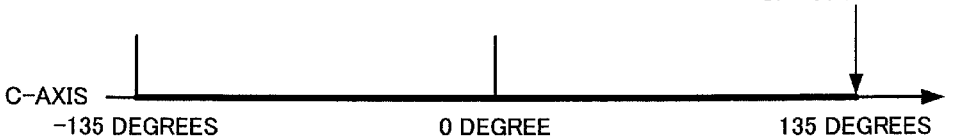

NUMERICAL CONTROLLER HAVING WORKPIECE SETTING ERROR COMPENSATION MEANS

RELATED APPLICATION DATA

This application claims priority under 35 U.S.C. §119 and/or §365 to Japanese Application No. 2007-260972, filed Oct. 4, 2007, the entire contents of which are incorporated herein by reference.

BACKGROUND OF THE INVENTION

1. Field of the Invention

The present invention relates to a numerical controller controlling a 5-axis machine tool that machines a workpiece set on a table using three linear axes and two rotation axes, more particularly to a numerical controller having a workpiece setting error compensation means for compensating a setting error arising during setting of a workpiece.

2. Description of the Related Art

A workpiece is fixed by a jig to make machining by a machine tool easy. However, use of the jig causes error (offset) in setting of a workpiece on a machine tool, so such setting error needs to be compensated.

The method for compensating such setting error is disclosed in, for example, U.S. Pat. No. 5,661,654. The technology disclosed in this U.S. Patent relates to the compensation of error in setting of a workpiece in a numerical controller that carries out concurrent 5-axis control of the tool relative to a workpiece attached to a jig. The positions and directions of the tool in the workpiece coordinate system are determined on the basis of numerical commands and preset amounts of error are compensated in the determined directions. Then, the coordinates of the five axes that meet the compensated tool positions and tool directions are obtained and, based on the obtained coordinates, a numerical control command is given to the driving means of each axis.

In the above U.S. Patent, the arctangent function is used to calculate a position on the B-axis or A-axis. However, the arctangent function generally has two solutions in the angular range of 0 to 360 degrees, so the compensated position on the B-axis or A-axis cannot be determined uniquely.

In addition, the compensated position obtained in this way is generally different from a command position and it may be impossible to move to the compensated position depending on the machine structure or the like. For example, when the A-axis is a table tilting axis as described in the above U.S. Patent, it is generally impossible to move to any angle in the angular range of 0 to 360 degrees. In other words, the command position is generally output by Computer Aided Manufacturing (CAM); the operable range can be set by CAM and the command position is determined within the operable range by CAM. However, the compensated position obtained by a numerical controller is generally different from the command position, so it may be impossible to move to the compensated position depending on the machine structure or the like. Alternatively, an attempt to move to an unmovable position can cause an over travel alarm or a machine breakage unexpectedly.

SUMMARY OF THE INVENTION

An object of the present invention is to provide a numerical controller that controls a 5-axis machine tool for machining a workpiece fixed on the table using three linear axes and two rotation axes, has a workpiece setting error compensation means for compensating setting error arising during setting of the workpiece, and can move the positions of the two rotation axes compensated by the workpiece setting error compensation means to more desirable positions close to the command positions.

Another object of the present invention is to provide a numerical controller that controls a 5-axis machine tool for machining a workpiece fixed on the table using three linear axes and two rotation axes, has a workpiece setting error compensation means for compensating setting error arising during setting of the workpiece, and can move the positions of the two rotation axes compensated by the workpiece setting error compensation means to more desirable positions within a restricted range.

The numerical controller according to the present invention controls a 5-axis machine tool for machining a workpiece set on a table using three linear axes and two rotation axes.

A first aspect of the numerical controller comprises a workpiece setting error compensation means for compensating setting error arising during setting of the workpiece. The workpiece setting error compensation means includes a tool position/direction calculation means for calculating a tool position and a tool direction in a command coordinate system based on command values, an error compensation means for compensating error in the three linear axes and the two rotation axes based on preset error amounts in order to keep the tool position and the tool direction in the command coordinate system calculated by the tool position/direction calculation means, and a solution selection means for, if a trigonometric function used for error compensation performed by the error compensation means has a plurality of solution sets, selecting, from the plurality of solution sets, a solution set closest to the tool direction in the command coordinate system calculated by the tool position/direction calculation means and using the solution set as the positions of the two rotation axes compensated in the above error compensation. The numerical controller drives three linear axes and the two rotation axes based on coordinates in the three linear axes and the two rotation axes obtained by the workpiece setting error compensation means.

If a trigonometric function used for error compensation performed by the error compensation means has a plurality of solution sets for arctangent, arccosine or arcsine of the two rotation axes, the solution selection means selects, from the plurality of solution sets, a solution set closest to the tool direction in the command coordinate system calculated by the tool position/direction calculation means.

A second aspect of the numerical controller comprises a workpiece setting error compensation means for compensating setting error arising during setting of the workpiece and a rotation axis operation range setting means for setting the operable ranges of the rotation axes in advance. The workpiece setting error compensation means includes a tool position/direction calculation means for calculating a tool position and a tool direction in a command coordinate system based on command values, an error compensation means for compensating error in the three linear axes and the two rotation axes based on preset error amounts in order to keep the tool position and the tool direction in the command coordinate system calculated by the tool position/direction calculation means; and a rotation axis position rounding means for rounding positions of the two rotation axes obtained by the error compensation means so that the positions fall within the operable ranges set by the rotation axis operation range setting means. The numerical controller drives the three linear axes and the two rotation axes based on the coordinates in the three linear axes and the two rotation axes obtained by the workpiece setting error compensation means.

According to the present invention, if a trigonometric function used for error compensation has a plurality of solution sets, the rotation axis position closest to the tool direction in the command coordinate system calculated on the basis of command values is selected from the plurality of solution sets. This enables the compensated rotation axes to move to more desirable positions closest to the command positions.

The rotation axes positions can be moved to more desirable positions within a restricted range if rounded so as to fall within the prescribed rotation axis operable range.

BRIEF DESCRIPTION OF THE DRAWINGS

The purposes and advantages of the present invention, including those described above, will be clarified by reference to the attached drawings in combination with the description of the embodiment presented below. Of these drawings:

FIG. 3 shows the operable ranges of the B-axis and the C-axis using number lines indicating positions on their rotation axes.

DETAILED DESCRIPTION OF THE PREFERRED EMBODIMENTS

Figure 1:
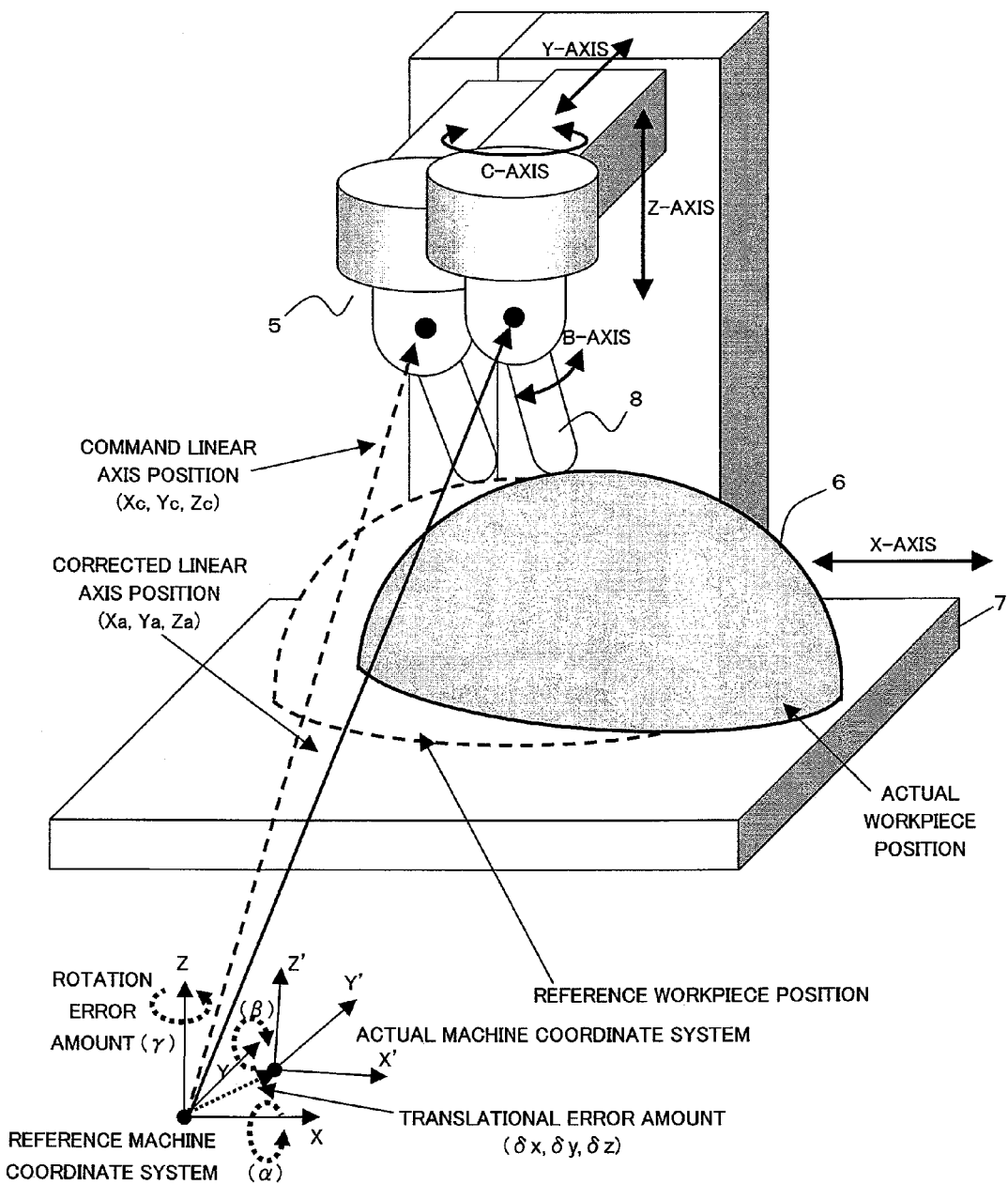
FIG. 1 illustrates the compensation of workpiece setting error in a machine tool with a rotary tool head.

FIG. 1 illustrates the compensation of workpiece setting error in a machine tool with a rotary tool head. In this machine tool, a tool head 5 is rotated by the C-axis about the Z-axis and the B-axis about the Y-axis as the X, Y, and Z linear axes move.

The actual position of a workpiece 6 deviates from its right position because it is not set exactly or a table 7 is slanted. The amount of deviation is measured in advance and set as translational error amounts ($\delta x$, $\delta y$, $\delta z$) in the X-, Y-, and Z-coordinates in the reference machine coordinate system, a rotation error amount ($\alpha$) about the X-axis, a rotation error amount ($\beta$) about the Y-axis, and a rotation error amount ($\gamma$) about the Z-axis. An actual machine coordinate system is created relative to the reference machine coordinate system based on the set error amounts so that the reference workpiece position in the reference machine coordinate system matches the actual workpiece position in the actual machine coordinate system.

A program command (Xc, Yc, Zc, Bc, Cc) is specified in the reference machine coordinate system. That is, the reference machine coordinate system is used as a command coordinate system. The workpiece setting error in the three linear axes and the two rotation axes is compensated as described below on the basis of the preset translational error amounts ($\delta x$, $\delta y$, $\delta z$) in the X-, Y-, and Z-axis directions, rotation error amount ($\alpha$) about the X-axis, rotation error amount ($\beta$) about the Y-axis, and rotation error amount ($\gamma$) about the Z-axis in order to keep the position and direction of a tool 8 according to the program command in the actual machine coordinate system, that is, to make the position and direction of the tool 8 in the actual machine coordinate system match the position and direction of the tool 8 according to the program command in the reference machine coordinate system.

Figure 2:
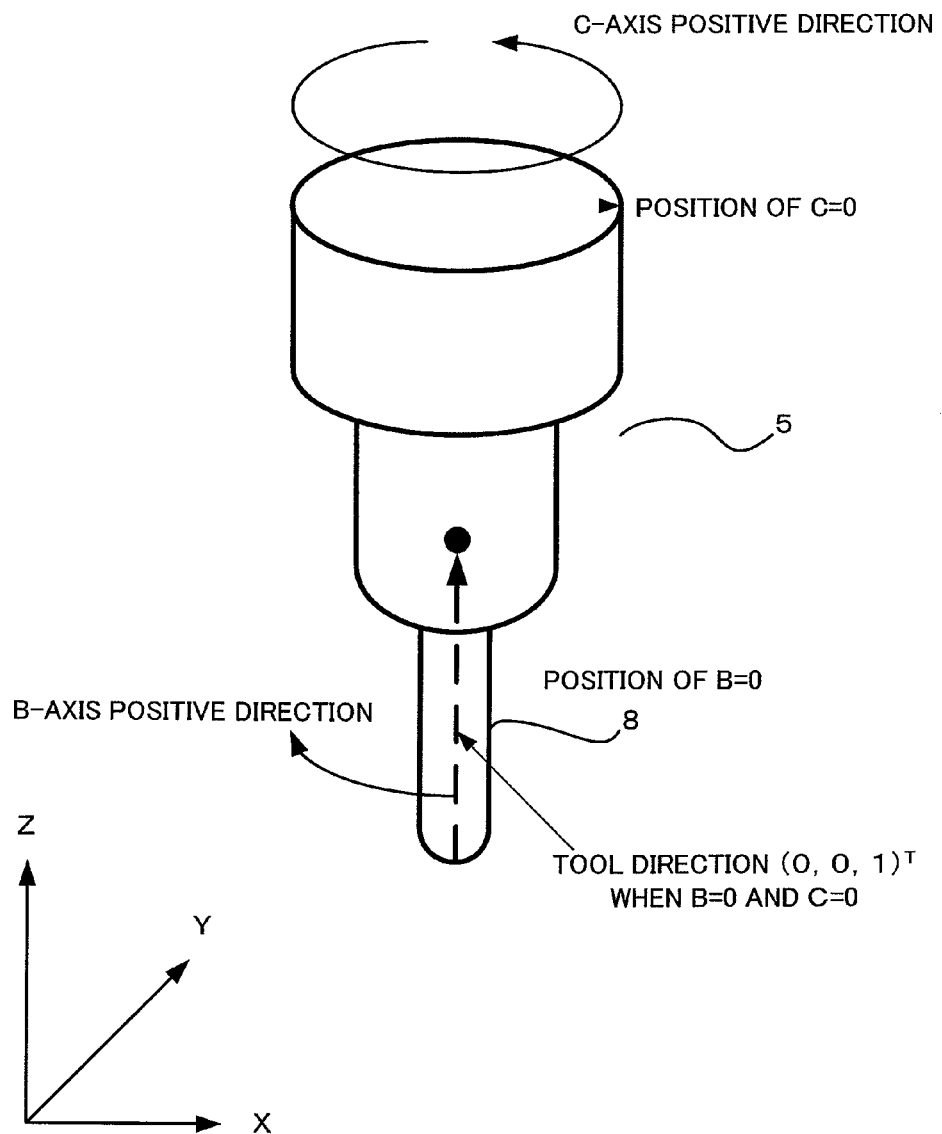
FIG. 2 shows the attitude and the rotation directions of the B-axis and the C-axis when both the B-axis position and C-axis position of the tool shown in FIG. 1 are 0.

FIG. 2 shows the rotation directions of the B- and C-axes and the attitude when the B-axis position of the tool 8 is 0 (B=0) and the C-axis position is 0 (C=0), where the tool direction when B=0 and C=0 is assumed to be $(0, 0, 1)^T$.

First, the position and direction of the tool in the command coordinate system (in the reference machine coordinate system, in the case of the embodiment of the present invention) are calculated on the basis of command values.

Tool direction $(I, J, K)^T$ when B=Bc and C=Cc is obtained by equation (1) below. In this case, the tool direction $(I, J, K)^T$ is the direction of the tool 8 in the command coordinate system. The superscript "T" indicates transposition. In addition, a trigonometric function such as "cos (Cc)" is indicated as "cos Cc" as appropriate.

$$\begin{bmatrix} I \\ J \\ K \end{bmatrix} = \begin{bmatrix} \cos Cc & -\sin Cc & 0 \\ \sin Cc & \cos Cc & 0 \\ 0 & 0 & 1 \end{bmatrix} \begin{bmatrix} \cos Bc & 0 & \sin Bc \\ 0 & 1 & 0 \\ -\sin Bc & 0 & \cos Bc \end{bmatrix} \begin{bmatrix} 0 \\ 0 \\ 1 \end{bmatrix} \quad (1)$$

$$= \begin{bmatrix} \cos Cc * \sin Bc \\ \sin Cc * \sin Bc \\ \cos Bc \end{bmatrix}$$

Since the program command is specified in the reference machine coordinate system, the position of the tool 8 in the command coordinate system indicates the program command (Xc, Yc, Zc) itself of a linear axis.

Next, error compensation is performed as described below. The tool direction $(I, J, K)^T$ is compensated to $(Ia, Ja, Ka)^T$ as shown in equation (2) using the rotation error amount ($\alpha$) about the X-axis, the rotation error amount ($\beta$) about the Y-axis, and the rotation error amount ($\gamma$) about the Z-axis. In this case, rotation error is compensated in the order of ($\alpha$), ($\beta$), and ($\gamma$).

$$\begin{bmatrix} Ia \\ Ja \\ Ka \end{bmatrix} = \begin{bmatrix} \cos\gamma & -\sin\gamma & 0 \\ \sin\gamma & \cos\gamma & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} 1 & 0 & 0 \\ 0 & \cos\alpha & -\sin\alpha \\ 0 & \sin\alpha & \cos\alpha \end{bmatrix} \begin{bmatrix} I \\ J \\ K \end{bmatrix} \quad (2)$$

Similarly, $(Xc, Yc, Zc)^T$ is compensated to $(Xa, Ya, Za)^T$ as shown in equation (3). In compensation of $(Xc, Yc, Zc)^T$, compensation by translational error ($\delta x$, $\delta y$, $\delta z$) as well as compensation by rotation error is made.

$$\begin{bmatrix} Xa \\ Ya \\ Za \end{bmatrix} = \begin{bmatrix} \cos\gamma & -\sin\gamma & 0 \\ \sin\gamma & \cos\gamma & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \quad (3)$$

$$\begin{bmatrix} 1 & 0 & 0 \\ 0 & \cos\alpha & -\sin\alpha \\ 0 & \sin\alpha & \cos\alpha \end{bmatrix} \begin{bmatrix} Xc \\ Yc \\ Zc \end{bmatrix} + \begin{bmatrix} \delta x \\ \delta y \\ \delta z \end{bmatrix}$$

B-axis position Ba and C-axis position Ca that meet $(Ia, Ja, Ka)^T$ obtained by equation (2) above are calculated as described below. In this case, both arccosine and arctangent are assumed to result in angles in the range of 0 to 180 degrees. Since variable "n" of "n*360" in calculation of arctangent is an integer, positions to which the n-fold of 360 degrees is added are also solutions. That is, the C-axis can make any revolution in the positive or negative direction, but the B-axis can revolve only in the range of −180 degrees to 180 degrees.

1) When Ia>0 and Ja>0

First Solution $$Ba_1 = \arccos(Ka) \quad (4)$$
$$Ca_1 = \arctan\frac{Ja}{Ia} + n*360 \text{ degrees}$$

Second Solution $$Ba_2 = -\arccos(Ka) \quad (5)$$
$$Ca_2 = \arctan\frac{Ja}{Ia} + 180 \text{ degrees} + n*360 \text{ degrees}$$

2) When Ia<0 and Ja>0

First Solution $$Ba_1 = \arccos(Ka) \quad (6)$$
$$Ca_1 = \arctan\frac{Ja}{Ia} + n*360 \text{ degrees}$$

Second Solution $$Ba_2 = -\arccos(Ka) \quad (7)$$
$$Ca_2 = \arctan\frac{Ja}{Ia} + 180 \text{ degrees} + n*360 \text{ degrees}$$

3) When Ia<0 and Ja<0

First Solution $$Ba_1 = \arccos(Ka) \quad (8)$$
$$Ca_1 = \arctan\frac{Ja}{Ia} + 180 \text{ degrees} + n*360 \text{ degrees}$$

Second Solution $$Ba_2 = -\arccos(Ka) \quad (9)$$
$$Ca_2 = \arctan\frac{Ja}{Ia} + n*360 \text{ degrees}$$

4) When Ia>0 and Ja<0

First Solution $$Ba_1 = \arccos(Ka) \quad (10)$$
$$Ca_1 = \arctan\frac{Ja}{Ia} + 180 \text{ degrees} + n*360 \text{ degrees}$$

Second Solution $$Ba_2 = -\arccos(Ka) \quad (11)$$
$$Ca_2 = \arctan\frac{Ja}{Ia} + n*360 \text{ degrees}$$

5) When Ia=0 and Ja>0

First Solution $$Ba_1 = \arccos(Ka) \quad (12)$$
$$Ca_1 = 90 \text{ degrees} + n*360 \text{ degrees}$$

Second Solution $$Ba_2 = -\arccos(Ka) \quad (13)$$
$$Ca_2 = 270 \text{ degrees} + n*360 \text{ degrees}$$

6) When Ia=0 and Ja<0

First Solution $$Ba_1 = \arccos(Ka) \quad (14)$$
$$Ca_1 = 270 \text{ degrees} + n*360 \text{ degrees}$$

Second Solution $$Ba_2 = -\arccos(Ka) \quad (15)$$
$$Ca_2 = 90 \text{ degrees} + n*360 \text{ degrees}$$

7) When Ia>0 and Ja=0

First Solution $$Ba_1 = \arccos(Ka) \quad (16)$$
$$Ca_1 = 0 \text{ degree} + n*360 \text{ degrees}$$

Second Solution $$Ba_2 = -\arccos(Ka) \quad (17)$$
$$Ca_2 = 180 \text{ degrees} + n*360 \text{ degrees}$$

8) When Ia<0 and Ja=0
First Solution $$Ba_1 = \arccos(Ka) \quad (18)$$
$$Ca_1 = 180 \text{ degrees} + n*360 \text{ degrees}$$

Second Solution $$Ba_2 = -\arccos(Ka) \quad (19)$$
$$Ca_2 = 0 \text{ degree} + n*360 \text{ degrees}$$

9) When Ia=0, Ja=0, and Ka=1
Only First Solution $$Ba_1 = 0 \text{ degree} \quad (20)$$
$$Ca_1 = C_C$$

The case where Ia=0, Ja=0, and Ka=−1 is not described above because it is not present in this machine structure.

In equations (4) to (19) above, arccosine is used to obtain Ba, but arcsine can also be used as shown below. In equation (21), arcsine is assumed to result in values in the range of 0 to 90 degrees.

$$\text{When } Ka \geq 0: Ba = \arcsin\left(\sqrt{Ia^2 + Ja^2}\right) \quad (21)$$
$$\text{When } Ka < 0: Ba = \arcsin\left(\sqrt{Ia^2 + Ja^2}\right) + 90 \text{ degrees}$$

There are two solution sets for each of cases 1), 2), 3), 4), 5), 6), 7), and 8) above; D in equation (22) below is calculated for each solution set and "n" and the combination of the solution set and "n" that gives the minimum D value is selected. However, there is only one solution set in case 9) above, so the solution of equation (20) above is selected.

$$D = (Bc-Ba)^2 + (Cc-Ca)^2 \quad (22)$$

Accordingly, the tool direction closest to the direction of the tool 8, in the command coordinate system, that is calculated on the basis of the command values Bc and Cc is selected. The solutions selected in this way are assumed to be Bs and Cs, respectively.

FIG. 3 shows the driven ranges of the B-axis and the C-axis using number lines indicating positions on their rotation axes. The B-axis and the C-axis may have their operable ranges. In this case, the B-axis is assumed to revolve in the range of −45 degrees to +45 degrees and the C-axis is assumed to revolve in the range of −135 degrees to +135 degrees. These rotation ranges are set in advance. In this connection, it should be noted that in obtaining the solutions of equations (4) to (19), we assumed, as described above, "the C-axis can make any revolution in the positive or negative direction, but the B-axis can revolve only in the range of −180 degrees to 180 degrees". However, in the case shown in FIG. 3, it is assumed that the B-axis can revolve only in the range of −45 degrees to +45 degrees and the C-axis can revolve only in the range of −135 degrees to +135 degrees.

When the combination of the solution set and "n" that gives the minimum D value is selected as described above, if the selected solution Bs or Cs exceeds the operable range of the B-axis or the C-axis, respectively, then the position of the B-axis or the C-axis is rounded to the position closest to Bs or Cs within the operable range. For example, when Bs=−50 degrees ((a) in FIG. 3) and Cs=140 degrees ((c) in FIG. 3), if the rounded B-axis position is Br and the rounded C-axis position is Cr, then Br is −45 degrees ((b) in FIG. 3) and Cr is +135 degrees ((d) in FIG. 3) and the three linear axes and two rotation axes are driven to these positions and $(Xa, Ya, Za)^T$ obtained by equation (3) above. These driven ranges are shown in FIG. 3 with number lines indicating positions on the rotation axes.

Figure 4:
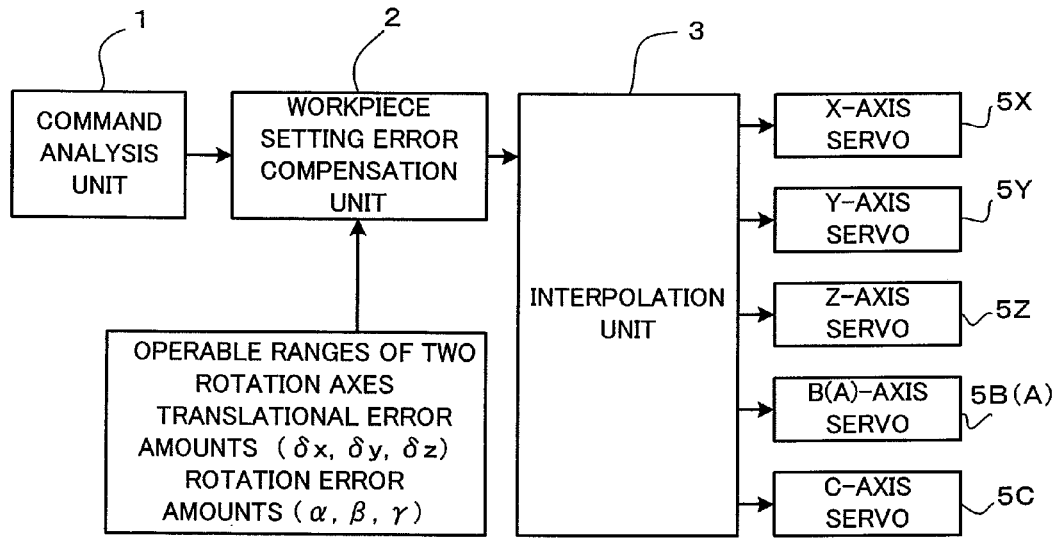
FIG. 4 is a schematic block diagram showing an embodiment of the numerical controller of the present invention that compensates workpiece setting error in a program command.

FIG. 4 is a schematic block diagram showing an embodiment of the numerical controller of the present invention that compensates setting error for a program command analyzed by a command analysis unit. In this embodiment, command values are values instructed by a program.

Figure 5:
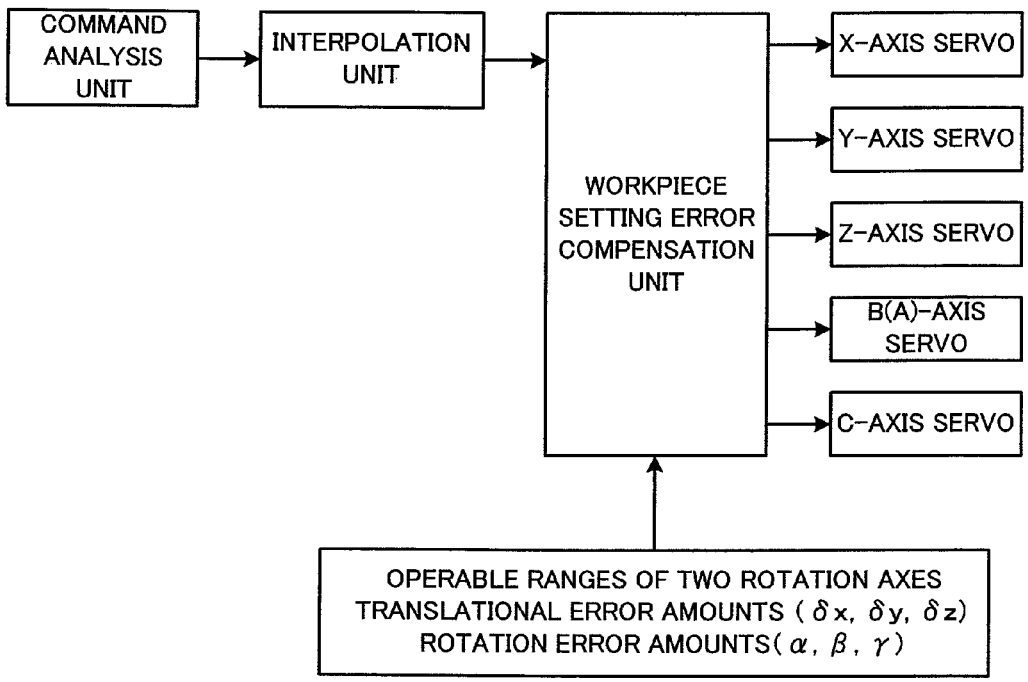
FIG. 5 is a schematic block diagram showing an embodiment of the numerical controller of the present invention that compensates workpiece setting error on an interpolated position.

FIG. 5 is a schematic block diagram showing an embodiment of the numerical controller of the present invention that compensates workpiece setting error for an interpolated position. In this embodiment, command values represent interpolated positions of X-axis, Y-axis, Z-axis, B-axis, and C-axis used to compensate workpiece setting error.

In the above description, the 5-axis machine tool controlled by the numerical controller of the present invention is a machine with a rotary tool head. However, the 5-axis machine tool also includes a machine with a rotary table rotated by two rotation axes and a mixed type machine with a table rotated by one rotary axis and a tool head rotated by the other rotation axis. Similarly in these machines, if a trigonometric function used for workpiece setting error compensation, such as the arctangent, arccosine, or arcsine on two rotation axes has a plurality of solution sets, it is possible to select the solution closest to the tool direction in the command coordinate system calculated on the basis of command values, as described above. In addition, there may be the operable ranges of rotation axes in these machine and, in such a case, it is possible to select the rotation axis position closest to the solution selected within their operable ranges.

In the above description, the two rotation axes are the C-axis about the Z-axis and the B-axis about the Y-axis, but the rotation axes may be the A-axis about the X-axis and the C-axis about the Z-axis or may be the A-axis about the X-axis and the B-axis about the Y-axis. In addition, it may be also possible to combine these two rotation axes with the machine with a rotary table or the mixed type machine described above.

Figure 6:
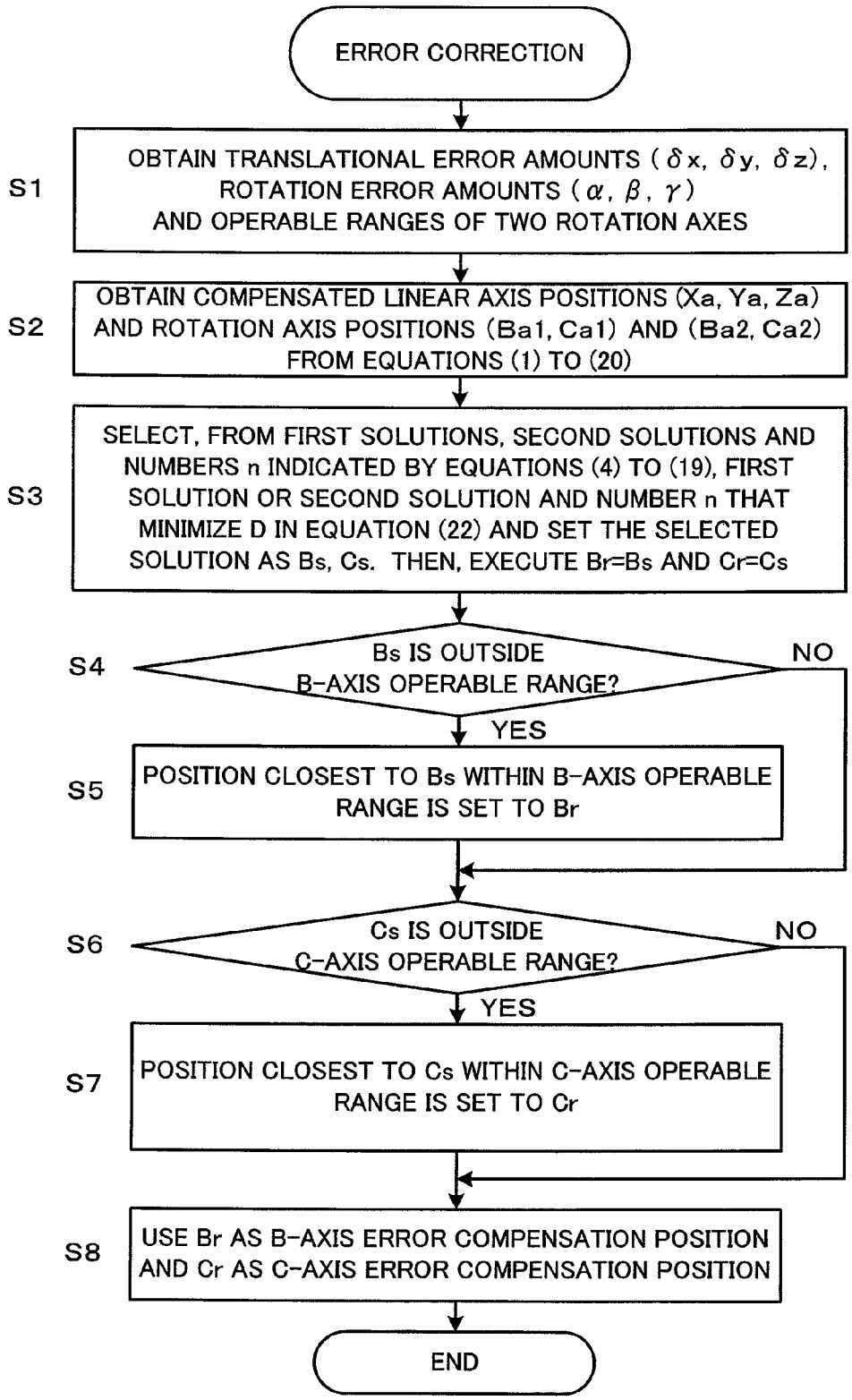
FIG. 6 is a flowchart showing the algorithm executed by an error compensation section in the numerical controller of the present invention.

FIG. 6 is a flowchart showing the algorithm executed by an error compensation section of the numerical controller of the present invention.

First, translational error amounts (δx, δy, δz), rotation error amounts (α, β, γ), and the operable ranges of two rotation axes (C-axis and B-axis) are obtained (step S1).

Next, the compensated linear axis position (Xa, Ya, Za), the first solutions of rotation axis positions (Ba1, Ca1), and the second solutions of rotation axis positions (Ba2, Ca2) are obtained by equations (1) to (20) (step S2). Of the first solutions, second solutions, and numbers n indicated by equations (4) to (19), the first solutions or second solution and number n that minimize the D value in equation (22) is selected, and the solutions selected in this way are set to Bs and Cs. Further, Bs is assigned to Br and Cs is assigned to Cr (step S3).

Next, whether or not Bs falls outside the B-axis operable range is determined (step S4). If Bs falls outside the B-axis operable range, the position closest to Bs within the B-axis operable range is set to Br (Br set in step S3 is overwritten)

(step S5). If Bs does not fall outside the B-axis operable range, then whether or not Cs falls outside the C-axis operable range is determined (step S6).

If Cs is determined to fall outside the operable range of the C-axis in step S6, the position closest to Cs within the C-axis operable range is set to Cr (Cr set in step S3 is overwritten) (step S7) and the processing proceeds to step S8. If Cs is determined not to fall outside the C-axis operable range in step S6, the processing proceeds to step S8. In step S8, Br set in step S3 or updated in step S5 is adopted as the B-axis error compensation position, Cr set in step S3 or updated in step S7 is adopted as the C-axis error compensation position, and the processing is terminated.

Figure 7:
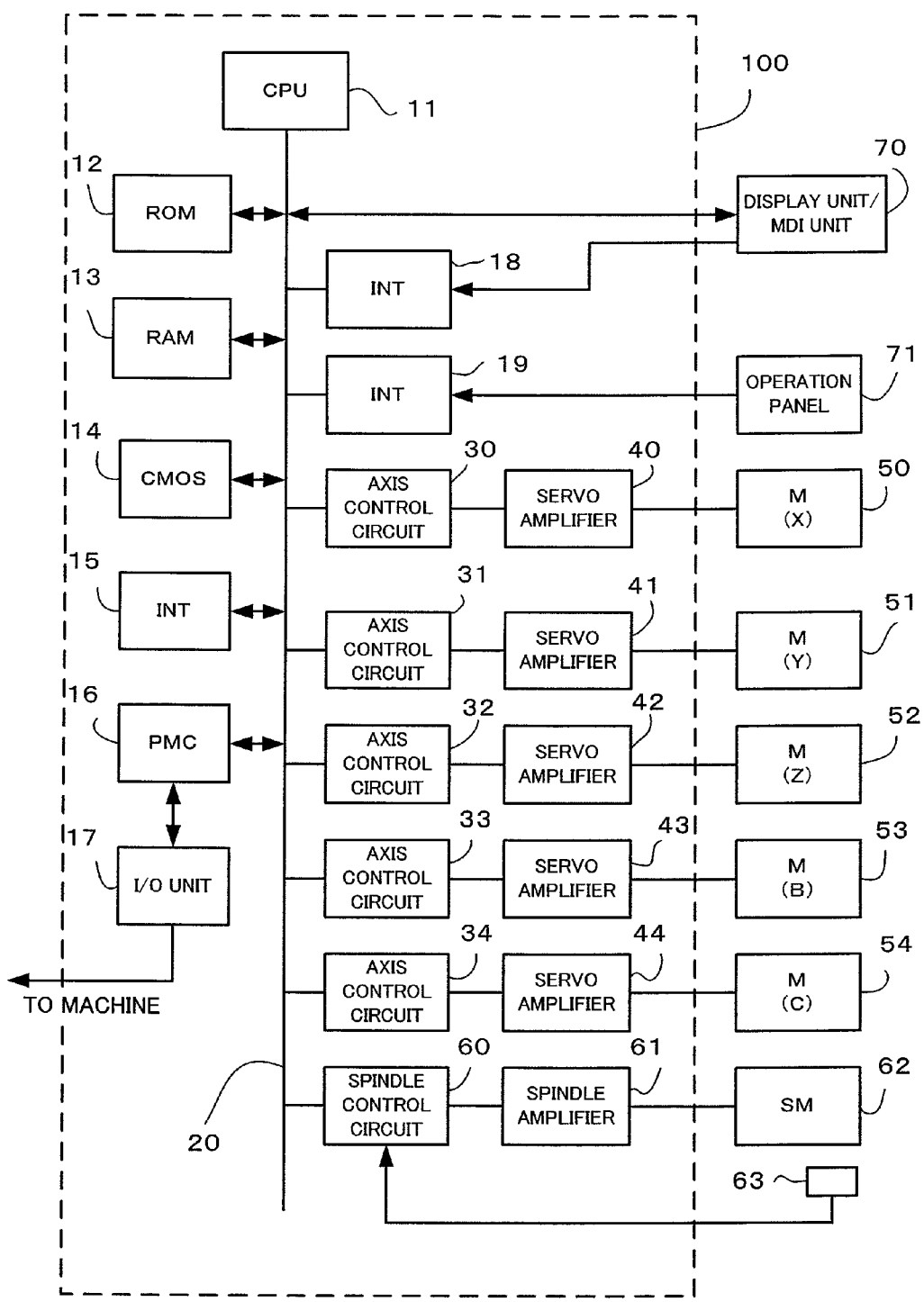
FIG. 7 is a diagram showing the main elements of an embodiment of the numerical controller of the present invention.

FIG. 7 is a block diagram showing the main elements of an embodiment of the numerical controller (CNC) 100 of the present invention.

A CPU 11 is a processor that controls the numerical controller in whole. The CPU 11 reads out a system program stored in a ROM 12 via a bus 20 and controls the entire numerical controller in whole according to the system program. A RAM 13 stores temporary calculation data, display data, and various types of data input by the operator via a display unit/MDI unit 70. A CMOS memory 14 is backed up by a battery (not shown) and configured as a non-volatile memory that retains stored data even when the numerical controller 100 is powered off. The CMOS memory 14 stores machining programs read in through an interface 15 and other machining programs input from the display unit/MDI unit 70. The ROM 12 previously stores various system programs for performing processing in an edit mode required for creating and editing a machining program or processing of automatic operation. A machining program created by CAM or the like is input and stored in the CMOS memory 14 via the interface 15.

Axis control circuits 30 to 34 for individual axes receive motion commands for the individual axes issued by the CPU 11 and output the commands for the individual axes to servo amplifiers 40 to 44 for the individual axes. The servo amplifiers 40 to 44 receive these commands and drive servo motors 50 to 54 for the individual axes. The servo motors 50 to 54 of the individual axes have a built-in position/speed detector and feed back position/speed feedback signals from these position/speed detectors to the axis control circuits 30 to 34 for performing position and speed feed back control. The feedback of position and speed is not shown in FIG. 7.

The servo motors 50 to 54 drive the X-, Y-, Z-, B-, and C-axes of a 5-axis machine tool, respectively. A spindle control circuit 60 receives a spindle rotation command and outputs a spindle speed signal to a spindle amplifier 61. The spindle amplifier 61 receives the spindle speed signal, controls a spindle motor 62 to rotate at a command rotation speed, and the actual speed detected by the speed detector 63 is fed back to the spindle control circuit 60, thus performing speed control.

The numerical controller 100 described above has a similar structure as conventional numerical controllers and drives or controls a 5-axis machine tool. The CPU (processor) 11 of the numerical controller 100 executes the algorithms for compensating setting error arising during setting of a workpiece or for rounding the rotation axis position.

The invention claimed is:

1. A numerical controller controlling a 5-axis machine tool for machining a workpiece set on a table using three linear axes and two rotation axes, the numerical controller comprising a workpiece setting error compensation means for compensating setting error arising during setting of the workpiece, the workpiece setting error compensation means including:
   a tool position/direction calculation means for calculating a tool position and a tool direction in a command coordinate system based on command values; an error compensation means for compensating error in the three linear axes and the two rotation axes based on preset error amounts in order to keep the tool position and the tool direction in the command coordinate system calculated by the tool position/direction calculation means; and
   a solution selection means for, if a trigonometric function used for error compensation performed by the error compensation means has a plurality of solution sets, selecting, from the plurality of solution sets, a solution set closest to the tool direction in the command coordinate system calculated by the tool position/direction calculation means and using the solution set as the positions of the two rotation axes compensated in the above error compensation;
   wherein the three linear axes and the two rotation axes are driven based on coordinates in the three linear axes and the two rotation axes obtained by the workpiece setting error compensation means.

2. The numerical controller of claim 1, wherein if a trigonometric function used for error compensation performed by the error compensation means has a plurality of solution sets with arctangent, arccosine or arcsine for the two rotation axes, the solution selection means selects, from the plurality of solution sets, a solution set closest to the tool direction in the command coordinate system calculated by the tool position/direction calculation means.

3. The numerical controller according to claim 1, further comprising a rotation axis operation range setting means for setting operable ranges of rotation axes in advance, wherein said workpiece setting error compensation means further comprises:
   a rotation axis position rounding means for rounding positions of the two rotation axes obtained by the error compensation means so that the positions fall within the operable ranges set by the rotation axis operation range setting means;
   wherein the three linear axes and the two rotation axes are driven based on the coordinates in the three linear axes and the two rotation axes obtained by the workpiece setting error compensation means.

* * * * *